United States Patent [19]
Marcuse

[11] 4,260,221
[45] Apr. 7, 1981

[54] MULTIMODE FIBER WITH Z-DEPENDENT INDEX PROFILE

[75] Inventor: Dietrich Marcuse, Lincroft, N.J.

[73] Assignee: Bell Telephone Laboratories, Incorporated, Murray Hill, N.J.

[21] Appl. No.: 20,994

[22] Filed: Mar. 16, 1979

[51] Int. Cl.³ .............................................. G02B 5/14
[52] U.S. Cl. ........................................ 350/96.31; 65/2
[58] Field of Search ................. 350/96.30, 96.31; 65/2, 65/3 R, 3 A

[56] References Cited

U.S. PATENT DOCUMENTS

| | | | |
|---|---|---|---|
| 3,823,997 | 7/1974 | Gloge et al. | 350/96.31 |
| 3,904,268 | 9/1975 | Keck et al. | 350/96.31 |
| 4,006,962 | 2/1977 | Olshansky | 350/96.31 |
| 4,053,204 | 10/1977 | Miller | 350/96.31 |
| 4,053,205 | 10/1977 | Miller | 350/96.31 |
| 4,057,320 | 11/1977 | Marcatili | 350/96.31 |
| 4,099,835 | 7/1978 | French et al. | 350/96.30 |
| 4,105,283 | 8/1978 | Gloge et al. | 350/96.31 |
| 4,158,479 | 6/1979 | Geckeler | 350/96.31 |
| 4,179,188 | 12/1979 | Geckeler | 350/96.31 |
| 4,181,433 | 1/1980 | Marcuse | 356/73.1 |
| 4,204,745 | 5/1980 | Sakai et al. | 350/96.31 |

FOREIGN PATENT DOCUMENTS 2815115  10/1978  Fed. Rep. of Germany ........ 350/96.31

OTHER PUBLICATIONS

Gloge et al., "Multimode Theory of Graded-Core Fibers", *Bell System Tech. Journal*, vol. 52, No. 9, Nov. 1973, pp. 1563-1578.
Olshansky et al., "Pulse Broadening in Graded-Index Optical Fibers", *Applied Optics*, vol. 15, No. 2, Feb. 1976, pp. 483-491.
Olshansky, "Pulse Broadening Caused by Deviations from The Optimal Index Profile", *Applied Optics*, vol. 15, No. 3, Mar. 1976, pp. 782-788.
Eve et al., "Transmission Performances of Three Graded Index Fiber . . . ", *Proc. of 3rd Eur. Conf. on Opt. Comm.*, Sep. 1977, pp. 53-55.
Eve et al., "Wavelength Dependence of Light Propagation in . . . ", *Proc. of 4th Eur. Conf. on Opt. Commun.*, 1978, pp. 58-63.
Eve, "Multipath Time Dispersion Theory of an Optical Network", *Optical & Quantum Elect.*, vol. 10, No. 1, Jan. 1978, pp. 41-51.
Cohen et al., "Profile Dispersion Effects on Transmission Bandwidths . . . ", *IEEE Journ. of QE*, vol. QE-14, No. 1, Jan. 1978, pp. 37-41.
Marcuse, "Calculation of Bandwidth from Index Profiles . . . ", *Applied Optics* (to be published), pp. 1-16-+FIGS. 1-14.

*Primary Examiner*—John K. Corbin
*Assistant Examiner*—John D. Lee
*Attorney, Agent, or Firm*—Sylvan Sherman

[57] ABSTRACT

Increased mode dispersion in graded-index, multimode optical fibers due to defects in the index profile can be significantly reduced if the average defect is caused to vanish over the length of the fiber. For fibers with non-optimum $\alpha$-values, minimum impulse response can be approached provided $\alpha$ varies along the fiber, such that the average value of $\alpha$ is equal to $\alpha_{opt}$. The effect of fluctuations superimposed upon the index profile are minimized by introducing an odd number of phase reversals in the fluctuations equally spaced along the fiber.

5 Claims, 6 Drawing Figures

MULTIMODE FIBER WITH Z-DEPENDENT INDEX PROFILE

TECHNICAL FIELD

This application relates to graded-index, multimode optical fibers.

BACKGROUND OF THE INVENTION

It is well known that the impulse response of a graded-index, multimode fiber of given size and composition is a function of the index profile. In particular, it has been shown that for each wavelength there is an optimum power law distribution defined by an optimum power law coefficient $\alpha$ close to 2 for which the rms pulse width is a minimum. (See, for example, D. Gloge and E. A. J. Marcatili, "Multimode Theory of Graded-Core Fibers," *Bell System Technical Journal*, Vol. 52, No. 9, November 1973, pp. 1563-1578; and U.S. Pat. No. 3,823,997.) Small departures from this optimum $\alpha$-value cause the rms pulse width to increase dramatically. Thus, it has been considered very important to design graded-index, multimode fibers such that their refractive index profiles conform very closely to the optimum $\alpha$-value.

More recently, however, there has been experimental evidence that fibers with non-optimum $\alpha$-values can be cascaded to yield a narrower impulse response than is obtained for each of the fibers individually inasmuch as the fibers tend to complement each other such that the slower modes in one become the faster modes in the other and vice versa. (See, M. Eve, "Multipath Time Dispersion Theory of an Optical Network", *Optical and Quantum Electronics*, Vol. 10, No. 1, January 1978, pp. 41-51; M. Eve, A. Hartog, R. Kashyap and D. N. Payne, "Wavelength Dependence of Light Propagation in Long Fibre Links", *Fourth European Conference on Optical Communication* 1978, Symposium Digest, pp. 58-61; and M. Eve, P. C. Hensel, A. M. Hill, J. E. Midwinter, B. P. Nelson and J. R. Stern, "Transmission Performance of Three Graded Index Fibre Cables Installed in Operational Ducts", *Third European Conference on Optical Communication* 1977, Symposium Digest, pp. 53-55.)

At present, fiber preforms are designed for the optimum $\alpha$-value. However, controlling the fabrication process to achieve this is a difficult and, correspondingly, expensive process. Even with care, the index profiles in the resulting preforms and the fibers that are drawn therefore are rarely, if ever, optimum. To attempt to compensate for this by cascading different fibers is, at best, a haphazard solution to the problem.

A second problem affecting the impulse response of optical fibers resides in the manner in which fiber preforms are made. Typically, preforms are made by the successive deposition of layers of materials having slightly different refractive indices. Thus, the actual index profile is not a simple power law function but, rather, a power law upon which a small perturbation is superimposed. However, it is also well known that irregular departures of the refractive index profile from the ideal distribution also cause a broadening of the impulse response. (See, for example, R. Olshansky, "Pulse Broadening Caused By Deviations From The Optimal Index Profile", *Applied Optics*, Vol. 15, No. 3, March 1976, pp. 782-788; and D. Marcuse, "Calculations of Bandwidth From Index Profiles Of Optical Fibers, Part I: Theory", to be published in *Applied Optics*.) Thus, there are two factors which affect the signal bandwidth of an optical fiber. The first is the inability to realize the optimum index profile for a given operating frequency. The second, inherent in the preform fabrication process, relates to the perturbations on the index profile. Accordingly, it is the broad object of the present invention to minimize these deleterious effects upon fiber performance.

SUMMARY OF THE INVENTION

In accordance with one aspect of the present invention improved impulse response is achieved in fibers with non-optimum $\alpha$-values by varying $\alpha$ along the length of the fiber such that, on average, $\alpha$ deviates by equal amounts on either side of its optimum value. Varied in this manner, every fiber can be optimized over finite lengths during the manufacturing process by monitoring the fiber profile and making compensating changes in $\alpha$ whenever it is found to deviate from the optimum. The resulting relaxation in fabrication tolerances, and the fewer bad fibers should result in significant cost savings.

In accordance with a second aspect of the present invention, improved impulse response is obtained by the introduction over the length of the fiber of an odd number of reversals in the phase of any perturbations superimposed upon the power law index profile. These phase reversals similarly serve to average out the effect of the perturbations.

In both aspects of the invention, changes in $\alpha$ and in phase are made slowly as compared, for example, to the spatial distribution of changes that would be made to induce mode coupling.

DETAILED DESCRIPTION

Figure 1:
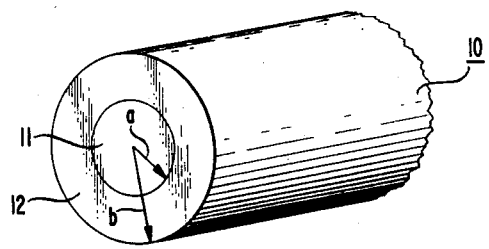
FIG. 1 shows a portion of an optical fiber to which the invention relates.

Referring to the drawings, FIG. 1 shows a portion of an optical fiber 10 to which the invention relates comprising a core region 11 of radius a surrounded by a cladding 12 having an outer radius b. In a preferred embodiment, the index profile of the fiber is such that the group velocities of the highest and lowest order modes are equal. This is obtained when the refractive index profile $n(r)$ is given by $$n(r) = \begin{cases} n_1 [1 - 2(\frac{r}{a})^\alpha \text{ opt } \Delta]^{\frac{1}{2}} & \text{for } r < a \\ n_2 = n_1 [1 - 2\Delta]^{\frac{1}{2}} & \text{for } a < r < b \end{cases} \quad (1)$$

where
$\alpha_{opt}$ is the $\alpha$-value for optimum impulse response;
$n_1$ is the refractive index at the center of core 11;
$n_2$ is the refractive index in the cladding 12; and $$\Delta = (n_1^2 - n_2^2)/2n_1^2 \qquad (2)$$

Figure 2:
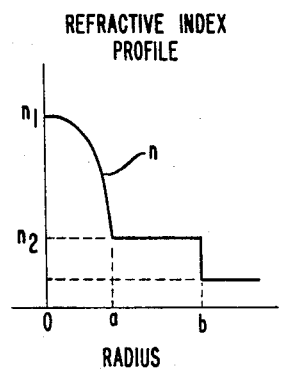
FIG. 2 shows the index profile of the fiber of FIG. 1.

FIG. 2 shows the index profile as given by equation (1) as a function of fiber radius, decreasing from a maximum value of $n_1$ at the center of the core to a lower value $n_2$ at the core-cladding interface at radius a. Between a and b the index remains constant at $n_2$. Beyond b, the index can either be greater than or less than $n_2$ depending upon the surrounding material. As illustrated, it is less.

Figure 3:
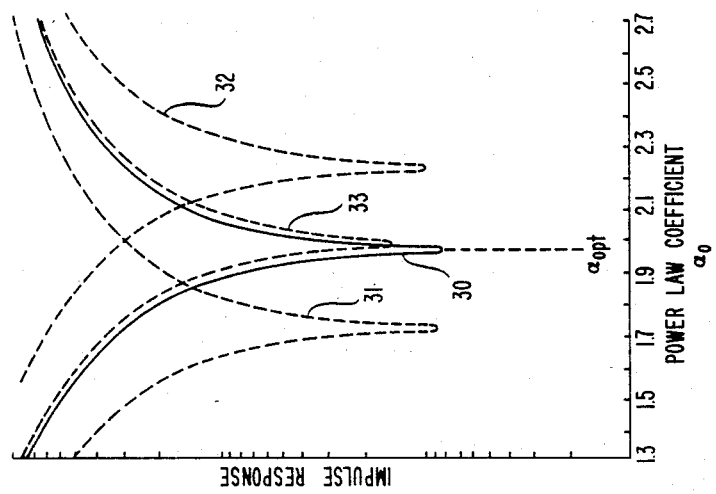

The impulse response of multimode fibers has been investigated by Gloge and Marcatili, cited hereinabove, and is well understood. For a fiber of given dimensions and composition, having a profile given by equation (1), the rms pulse width at the output end of the fiber varies dramatically as a function of $\alpha$, as illustrated by curve 30, shown in solid line in FIG. 3. This curve illustrates the case where $\alpha$ is constant over the length of the fiber. For purposes of illustration, calculations were made of a fiber having a core radius a=30 μm, $n_2$=1.457, and $n_1 - n_2 = 0.02$, corresponding to a $\Delta = 0.0138$. As can be seen, the curve has a very narrow minimum at $$\alpha_{opt} = 2 - (12/5)\Delta \qquad (3)$$

which, for the value of $\Delta$ given, occurs at 1.967. For $\alpha$-values different than $\alpha_{opt}$, the pulse width increases dramatically. For example, a 17 percent departure of $\alpha$ from its optimum value increases the rms pulse width by one order of magnitude. A two-fold increase occurs for a departure of as little as 1.3 percent.

The present invention is based upon the discovery that the optimum width of the impulse response can be obtained with non-optimum $\alpha$-values provided $\alpha$ varies along the fiber and deviates, on average, by equal amounts on either side of the optimum value. Thus, expressing $\alpha$ as a function of distance z along the fiber as $$\alpha(z) = f(z), \qquad (4)$$

minimum pulse width is nevertheless obtained if and when the average $\alpha$-value over the length of the fiber is equal to $\alpha_{opt}$. This is illustrated by the several dashed curves 31, 32 and 33 in FIG. 3.

Curves 31 and 32 are for the cases where $\alpha$ varies sinusoidally about a constant value $\alpha_o$. That is, $$\alpha(z) = \alpha_o + A \sin(2\pi Nz/L). \qquad (5)$$

where
A is the amplitude of the $\alpha$ variation;
L is the length of the fiber;
and
N is the number of periods within length L.
Curve 30, as noted above, is for the case where A=0. Curve 31 was calculated for the case where A=0.4, and N=½. It will be noted that curve 31 has substantially the same shape and the same minimum as curve 30, and that the minimum occurs for a value of $\alpha_o=1.72$. For this value of $\alpha_o$, the average value of $\alpha(z)$ over the length of the fiber is substantially equal to the optimum $\alpha$-value as computed for the case of constant $\alpha_o$.

Curve 32, for the case of A=0.4 and N=½, similarly displays the same overall shape and has a minimum at $\alpha_o=2.23$ such that the average $\alpha$-value over the length of the fiber is also approximately equal to $\alpha_{opt}$.

Curve 33 is for the case of A=0.4 and N=1, 2 and 3. The shift of curve 33 relative to curve 30 is attributable to the asymmetry of the rms pulse width curve 30 relative to the optimum $\alpha$-value. Nevertheless, it is remarkable that such large deviations of $\alpha$ along the length of the fiber increases the rms pulse width by only a factor of two over that obtained for constant $\alpha_o = \alpha_{opt}$. Even more remarkable are the cases illustrated by curves 31 and 32. Even though the pulse width at $\alpha_o=1.967$ for both of these curves is almost 40 times as large as that given by the solid curve, readjusting $\alpha_o$ such that the average of $\alpha(z)$ is equal to $\alpha_{opt}$ results in an rms pulse width that is substantially the same as the minimum for optimum $\alpha_o$. This illustrates that nearly complete compensation of multimode dispersion is possible even though the $\alpha(z)$ function is not symmetrical about its average value, and the $\alpha$-value along the fiber is actually optimum at only one or more points.

Figure 4:
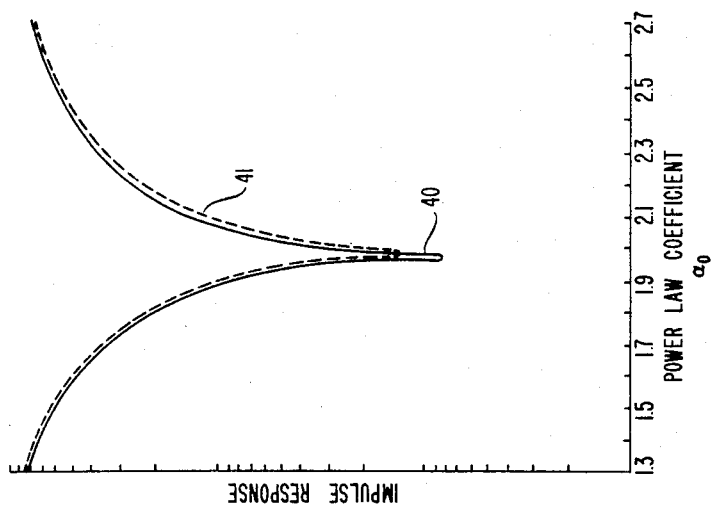
FIGS. 3 and 4 show rms pulse width curves as a function of $\alpha_o$.

Finally, curve 41 in FIG. 4 shows the pulse width curve for a linear $\alpha(z)$ curve given by $$\alpha(z) = \alpha_o + 0.4 (1 - 2z/L), \qquad (6)$$

and the corresponding curve 40 for constant $\alpha_o$. Aside from a slight shift due to the above-noted asymmetry, the curves are essentially the same with very effective compensation achieved.

Figure 5:
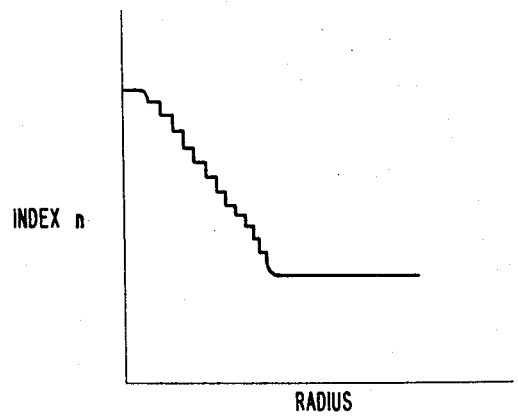
FIG. 5 shows an index profile including discrete incremental steps.

The second source of pulse broadening noted hereinabove is due to perturbations on the index profile. Fiber preforms are typically fabricated by the deposition of multiple layers of materials having slightly different refractive indices. As a result, the index profile tends to comprise a plurality of discrete steps, as indicated in FIG. 5. While there is a tendency for these steps to be smoothed out during the fiber drawing step, they are not completely eliminated. For purposes of discussion and explanation, we assume that the actual profile includes a slight sinusoidal fluctuation superimposed upon the ideal power law profile as given by $$n(r) = \begin{cases} n_1 [1 - (\frac{r}{a})^\alpha \Delta] + A' \sin(2\pi N' \frac{r}{a}) & \text{for } r < a \\ n_2 = n_1 (1 - \Delta) & \text{for } a < r < b \end{cases} \qquad (7)$$

where
A' is the magnitude of the fluctuations;
N' is the number of periods of the perturbation in the range 0<r<a;
and
the remaining parameters are as in equation (1).

Figure 6:
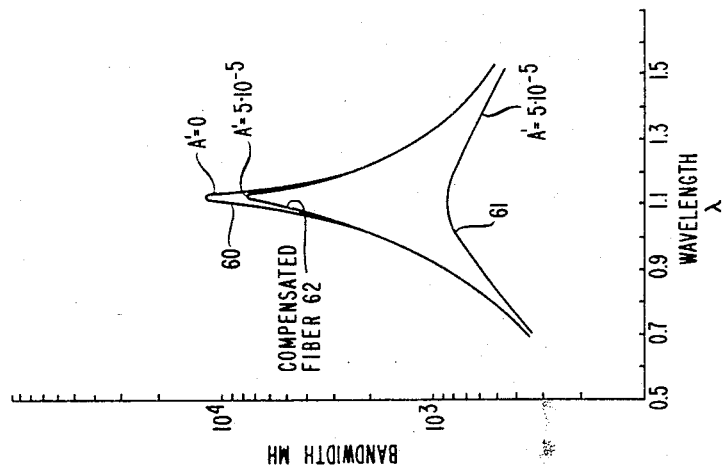
FIG. 6 shows graphically the effect upon bandwidth of fluctuations on the index profile, and improvements that can be realized in accordance with the present invention.

FIG. 6, now to be considered, shows the results of bandwidth calculations made as a function of wavelength for a germanium-doped fiber having an ideal power law profile with $n_1 - n_2 = 0.02$, and $\alpha = 1.9071$. In this case, illustrated by curve 60, there are no perturbations, i.e., A'=0. A second curve 61 is for the same fiber whose index profile has been distorted by a sinusoidal perturbation having ten periods (N'=10) of amplitude $A' = 5.10^{-5}$. It is readily apparent from these curves how dramatically such a slight, constant sinusoidal distortion of the profile reduces the bandwidth, i.e., increases the impulse response.

To reduce this distortion, in accordance with the present invention, a phase reversal in the perturbation is introduced. For purposes of calculation, a single 180 degree phase reversal is introduced at the midpoint along the fiber. That is, along the second half of the fiber, A' is equal to $-5.10^{-5}$. In all other respects, the two fiber lengths are the same. The resulting bandwidth curve 62 for this compensated case shows a marked improvement. While a comparison of curves 60 and 62 shows that while the compensation is not complete, the improvement over the uncompensated fiber, as given by curve 61, is substantial.

The extent of any compensation will depend upon the magnitude of the perturbation. The larger the magnitude, A', the greater the bandwidth reduction. However, in any case, there is a significant improvement over the uncompensated case.

As indicated hereinabove, a principal advantage of the present invention is that it permits one to compensate for deviations in the fiber index profiles which, if left uncompensated, would impair the fiber's usefulness as the transmission medium in an optical communication sytem. This can be done in the manner described by S. E. Miller (Case 76) in his copending application Ser. No. 020,995, filed Mar. 16, 1979, and assigned to applicant's assignee. In accordance with this technique, a "stub" preform is formed by means of the so-called "vapor-phase axial-deposition" (VAD) method while the fiber is simultaneously drawn from the end of the stub that is opposite to the end upon which the particulate glass material is being deposited. To monitor the fiber profile as it is being drawn, the technique disclosed by D. Marcuse in his copending application Ser. No. 896,347, filed Apr. 14, 1978 (now U.S. Pat. No. 4,181,433), and assigned to applicant's assignee, can be employed. As described in this application, the fiber is illuminated along a portion of its length, and the density distribution of the light focused by the fiber is measured. From these measurements, the index distribution can be calculated and compared with the desired index profile as stored in a computer and appropriate compensations made as the fiber is being drawn. If, for example, the measured $\alpha$ is greater than $\alpha_{opt}$, the distribution of index modifying dopants being deposited on the stub preform can be changed to reduce $\alpha$ such that, on average, the $\alpha$-value is optimized. Similarly, the location of the sources feeding the particulate material onto the stub can be displaced back and forth radially so as to introduce 180 degree phase reversals in any perturbation superimposed upon the index profile by the fabrication process.

SUMMARY

It has been shown that increased mode dispersion in graded-index, multimode fibers due to defects in the index profile can be significantly reduced if the average defect is caused to vanish over the length of the fiber. For fibers with non-optimum $\alpha$-values, minimum impulse response can be approached provided $\alpha$ varies along the fiber such that the average value of $\alpha$ is equal to $\alpha_{opt}$. The effect of fluctuations superimposed upon the index profile can be minimized by introducing an odd number of phase reversals in the fluctuations equally spaced along the fiber. In all cases, changes occur at a slow enough rate to minimize mode coupling. Inasmuch as the latter is enhanced for spatial variations that are smaller than about one centimeter, changes in the index profile in accordance with the present invention are advantageously made over intervals that are greater than one centimeter.

Ideally, the effect of the averaging would reduce the average deviation from the ideal to exactly zero over the length of the fiber. This, however, may be impractical and, in general, is unnecessary. For example, if the fiber is averaged over 10 meter intervals, the longest length of totally uncompensated fiber is only 5 meters. Thus, the maximum length of uncompensated fiber is typically small compared to the total fiber length.

I claim:

1. A multimode optical fiber (10) comprising an inner core region (11) surrounded by a cladding (12);

said core region having a substantially power law, refractive index profile which decreases from a maximum at the center of said core to a minimum at the core-cladding interface, said power law having an optimum exponent, $\alpha_{opt}$, for optimum impulse response;

characterized in that:

the average of any deviations in the $\alpha$-value of said profile about the optimum $\alpha$-value is minimized over finite intervals of said fiber.

2. The optical fiber in accordance with claim 1 wherein the $\alpha$-value varies along the length of said fiber such that, on average, $\alpha$ deviates equally to either side of $\alpha_{opt}$ over each of said finite intervals.

3. The optical fiber according to claim 2 wherein said deviations in $\alpha$ occur sufficiently slowly along the fiber so as to minimize mode coupling effects.

4. The optical fiber according to claim 3 wherein the spatial wavelength of said deviations is greater than one centimeter.

5. A method of fabricating an optical fiber preform including the steps of:

monitoring the refractive index profile of the preform as it is deposited;

determining the $\alpha$-value of said profile and comparing said $\alpha$-value to a predetermined optimum $\alpha$-value;

characterized in that:

the distribution of materials being deposited to form said preform is varied in response to said comparison such that the average of any deviations in the $\alpha$-value of said profile about the optimum $\alpha$-value is minimized.

* * * * *